US012223641B2

(12) United States Patent
Dudovich et al.

(10) Patent No.: US 12,223,641 B2
(45) Date of Patent: Feb. 11, 2025

(54) DEFECT DETECTION OF A SEMICONDUCTOR SPECIMEN

(71) Applicant: Applied Materials Israel Ltd., Rehovot (IL)

(72) Inventors: Boaz Dudovich, Rehovot (IL); Assaf Ariel, Rehovot (IL); Amir Bar, Rehovot (IL); Lior Yehieli, Rehovot (IL); Chen Itzikowitz, Rehovot (IL); Shiran Ben Israel, Rehovot (IL); Lior Katz, Jerusalem (IL); Eli Oren Joni, Rehovot (IL); Eyal Rot, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 334 days.

(21) Appl. No.: 17/748,996

(22) Filed: May 19, 2022

(65) Prior Publication Data
US 2023/0377125 A1 Nov. 23, 2023

(51) Int. Cl.
*G06K 9/00* (2022.01)
*G06T 3/10* (2024.01)
*G06T 7/00* (2017.01)
*H04N 7/01* (2006.01)

(52) U.S. Cl.
CPC ............... *G06T 7/001* (2013.01); *G06T 3/10* (2024.01); *H04N 7/01* (2013.01); *G06T 2207/20081* (2013.01); *G06T 2207/30148* (2013.01)

(58) Field of Classification Search
CPC . G06T 7/001; G06T 3/10; G06T 2207/20081; G06T 2207/30148; G06T 2207/10061; G06T 2207/20021; G06T 2207/20084; H04N 7/01
See application file for complete search history.

(56) References Cited

U.S. PATENT DOCUMENTS

| 10,181,185 B2 | 1/2019 | Park | |
|---|---|---|---|
| 10,657,214 B2 | 5/2020 | Banna | |
| 10,930,597 B2 | 2/2021 | Lim | |
| 2010/0091181 A1* | 4/2010 | Capps | G09G 5/397 348/E7.003 |
| 2011/0229040 A1* | 9/2011 | Thakkar | H04N 19/182 382/190 |
| 2015/0256804 A1* | 9/2015 | Wen | H04N 9/646 348/453 |
| 2016/0379075 A1* | 12/2016 | Ando | G06F 18/24 382/103 |

(Continued)

*Primary Examiner* — Avinash Yentrapati
(74) *Attorney, Agent, or Firm* — Lowenstein Sandler LLP (57) ABSTRACT

There is provided a system and method of defect detection of a semiconductor specimen. The method includes obtaining a first image of the specimen acquired at a first bit depth, converting by a first processor the first image to a second image with a second bit depth lower than the first bit depth, transmitting the second image to a second processor configured to perform first defect detection on the second image using a first defect detection algorithm to obtain a first set of defect candidates, and sending locations of the first set of defect candidates to the first processor, extracting, from the first image, a set of image patches corresponding to the first set of defect candidates based on the locations, and performing second defect detection on the set of image patches using a second defect detection algorithm to obtain a second set of defect candidates.

20 Claims, 4 Drawing Sheets

(56) References Cited

U.S. PATENT DOCUMENTS

| | | | |
|---|---|---|---|
| 2017/0193680 A1* | 7/2017 | Zhang | G06V 10/82 |
| 2017/0345140 A1* | 11/2017 | Zhang | G06V 10/82 |
| 2017/0351952 A1* | 12/2017 | Zhang | G06V 10/764 |
| 2019/0130208 A1* | 5/2019 | Michael | G06V 20/00 |
| 2019/0303717 A1* | 10/2019 | Bhaskar | G06F 18/214 |
| 2023/0288345 A1* | 9/2023 | Bar | G01N 21/9501 |
| 2023/0306580 A1* | 9/2023 | Ben-Shlomo | G06T 7/11 |
| 2023/0377125 A1* | 11/2023 | Dudovich | G06T 7/001 |
| 2024/0153043 A1* | 5/2024 | Einy | G06T 5/50 |

* cited by examiner

DEFECT DETECTION OF A SEMICONDUCTOR SPECIMEN

TECHNICAL FIELD

The presently disclosed subject matter relates, in general, to the field of examination of a semiconductor specimen, and more specifically, to defect detection on the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc. In some cases both the two phases can be implemented by the same inspection tool, and, in some other cases, these two phases are implemented by different inspection tools.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

By way of example, examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

SUMMARY

In accordance with certain aspects of the presently disclosed subject matter, there is provided a computerized system of defect detection of a semiconductor specimen, the system comprising a first processing and memory circuitry (PMC) configured to: obtain a first image representative of at least a part of the semiconductor specimen, the first image acquired by an inspection tool at a first bit depth; convert the first image to a second image with a second bit depth, wherein the second bit depth is a lower bit depth than the first bit depth; transmit the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC; upon receiving the locations from the second PMC, extract, from the first image, a set of image patches corresponding to the first set of defect candidates based on the locations; and perform second defect detection on the set of image patches using a second defect detection algorithm, giving rise to a second set of defect candidates.

In addition to the above features, the system according to this aspect of the presently disclosed subject matter can comprise one or more of features (i) to (x) listed below, in any desired combination or permutation which is technically possible:

(i). The first bit depth can be one of: 32 bits per pixel, 24 bits per pixel, and 16 bits per pixel. The second bit depth is a lower bit depth than the first bit depth, and can be one of: 16 bits per pixel and 8 bits per pixel.

(ii). The first PMC comprises one or more graphics processing units (GPUs) optimized to process images with the first bit depth.

(iii). The second PMC comprises one or more digital signal processors (DSPs) optimized to process images with the second bit depth.

(iv). The transformation function is specifically selected and configured to improve accuracy and/or sensitivity of the second image with the second bit depth.

(v). The first defect detection algorithm is a die-to-reference detection algorithm using one or more reference images of the second image.

(vi). The first defect detection algorithm is specifically configured for defect detection on one or more second images with the second bit depth.

(vii). The second defect detection algorithm comprises a machine learning (ML) model trained using one or more training images with the first bit depth and respective labels associated therewith indicative of presence of defects of interest (DOI) or nuisances thereof.

(viii). The second set of defect candidates are reviewed by a review tool, giving rise to a set of DOIs. The ML model is re-trained using images patches corresponding to the set of DOIs and associated with a label of DOI, and image patches corresponding to non-DOI defect candidates from the second set of defect candidates and associated with a label of nuisance, and the re-trained ML model is used to re-perform the second defect detection.

(ix). The first PMC is configured to obtain a plurality of first images sequentially acquired by the inspection tool during runtime inspection and representative of different parts of the semiconductor specimen, and perform the converting, transmitting, extracting, and performing for each given first image of the plurality of first images. Each given first image is converted adaptively by selecting a specific transformation function based on pixel value distribution of the given first image.

(x). The system further comprises the second PMC. The first PMC is optimized for first bit depth processing, and is thereby capable of improving detection sensitivity. The second PMC is optimized for second bit depth processing and is thereby capable of improving computation efficiency and lowering computation cost. The first PMC and the second PMC are leveraged/balanced in a specific way for performing respective defect detections on images with different bit depths, thereby enabling improved throughput without sacrificing the detection sensitivity.

In accordance with other aspects of the presently disclosed subject matter, there is provided a method of defect detection of a semiconductor specimen, the method performed by a first processor and memory circuitry (PMC) and comprising: obtaining a first image representative of at least a part of the semiconductor specimen, the first image acquired by an inspection tool at a first bit depth; converting the first image to a second image with a second bit depth, wherein the second bit depth is a lower bit depth than the first bit depth; transmitting the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC; upon receiving the locations from the second PMC, extracting, from the first image, a set of image patches corresponding to the first set of defect candidates based on the locations; and performing second defect detection on the set of image patches using a second defect detection algorithm, giving rise to a second set of defect candidates.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of defect detection of a semiconductor specimen, the method comprising: obtaining a first image representative of at least a part of the semiconductor specimen, the first image acquired by an inspection tool at a first bit depth; converting the first image to a second image with a second bit depth, wherein the second bit depth is a lower bit depth than the first bit depth; transmitting the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC; upon receiving the locations from the second PMC, extracting, from the first image, a set of image patches corresponding to the first set of defect candidates based on the locations; and performing second defect detection on the set of image patches using a second defect detection algorithm, giving rise to a second set of defect candidates.

This aspect of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "converting", "transmitting", "sending", "receiving", "extracting", "performing", "processing", "selecting", "training", "re-training", "acquiring", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the defect detection system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
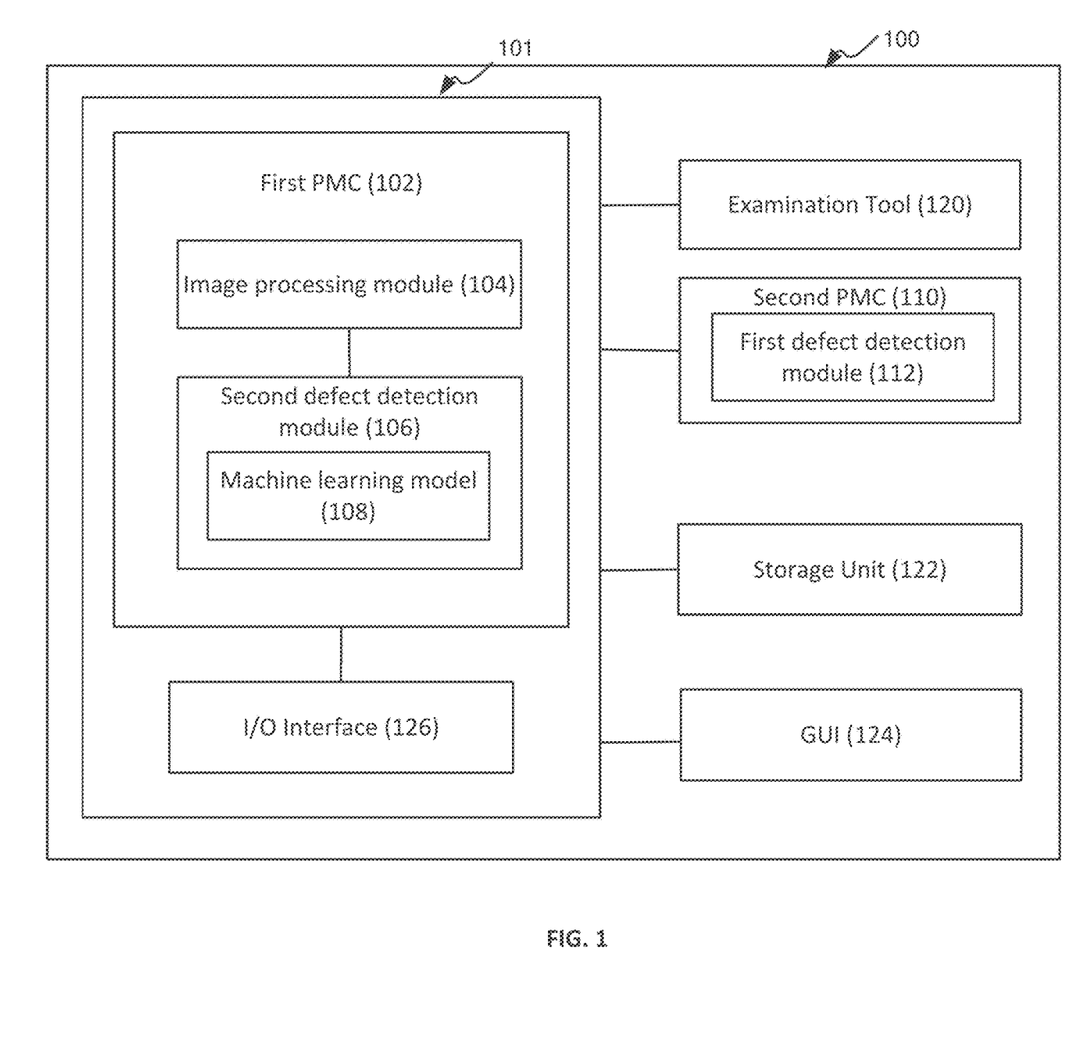
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations, such as, e.g., critical dimension (CD) measurements, with respect to the specimen. Specifically, the illustrated examination system 100 comprises a computer-based system 101 capable of enabling automatic defect detection of a semiconductor specimen. According to certain embodiments of the presently disclosed subject matter, system 101 can be configured to detect defects on a semiconductor specimen in runtime based on images obtained during specimen fabrication.

System 101 can be operatively connected to one or more examination tools 120. The examination tools 120 are configured to scan a specimen and capture images thereof to be further processed for various examination applications.

By way of example, the images used herein can refer to original images of a specimen captured during the manufacturing process and/or derivatives of the captured images obtained by various pre-processing stages. It is to be noted that in some cases the images referred to herein can include image data (e.g., captured images, processed images, etc.) and associated numeric data (e.g., metadata, hand-crafted attributes, etc.). It is further noted that image data can include data related to a layer of interest and/or to one or more layers of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). The inspection tool and review tool can be different tools located at the same or at different locations, or a single tool operated in two different modes. In some cases, at least one examination tool can have metrology capabilities and can be configured to perform metrology operations on the images.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

According to certain embodiments of the presently disclosed subject matter, one of the examination tools 120 is an inspection tool that scans a specimen (e.g., a wafer) to capture inspection images thereof. During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time (also referred to as field of view (FOV) of the tool). For instance, the inspection tool can be an optical inspection tool. At each step, light can be detected from a rectangular portion of the wafer and such detected light is converted into multiple intensity values at multiple points in the portion, thereby forming an image corresponding to the part/portion of the wafer. The size and dimension of the FOV can vary according to certain factors such as different tool configurations.

By way of example, in optical inspection, an array of parallel laser beams can scan the surface of a wafer along the swaths. The swaths are laid down in parallel rows/columns contiguous to one another to build up, swath-at-a-time, an image of the surface of the wafer. For instance, the tool can scan a wafer along a swath from up to down, then switch to the next swath and scan it from down to up, and so on and so forth, until the entire wafer is scanned. An image of a swath of the wafer is sometimes referred to as an image slice/strip. In order to meet the throughput requirement of the inspection, a wafer (e.g., at the size of 30 cm*30 cm) is typically scanned within a predetermined time period (e.g., 10-15 minutes). Therefore, the wafer is moved relatively fast with respect to the laser beams during the inspection, and the inspection image data is generated at a high data rate (e.g., at the level of ~Tb/s). The massive volume of inspection data as generated needs to be analyzed on the fly in real time which requires huge computer processing power.

For the purpose of enabling sensitive inspection, the inspection images should be acquired with good quality. By way of example, the inspection images can be acquired at a good resolution (i.e., the total number of pixels in an image). For instance, the image of an entire wafer or part thereof in some cases can be in the order of $10^{13}$ pixels. Additionally or alternatively, the images can be acquired at a relatively high bit depth. Bit depth, also referred to as color depth, or bits per pixel (BPP), refers to the number of bits used to represent a pixel in an image. The number of different colors/gray levels in an image depends on the depth of color or bits per pixel. For instance, a gray scale image can be of 8 bits per pixel, thus each pixel can have a value out of 256 different gray levels, while color images are usually of the 16 or 24 bits per pixel format.

Figure 6:
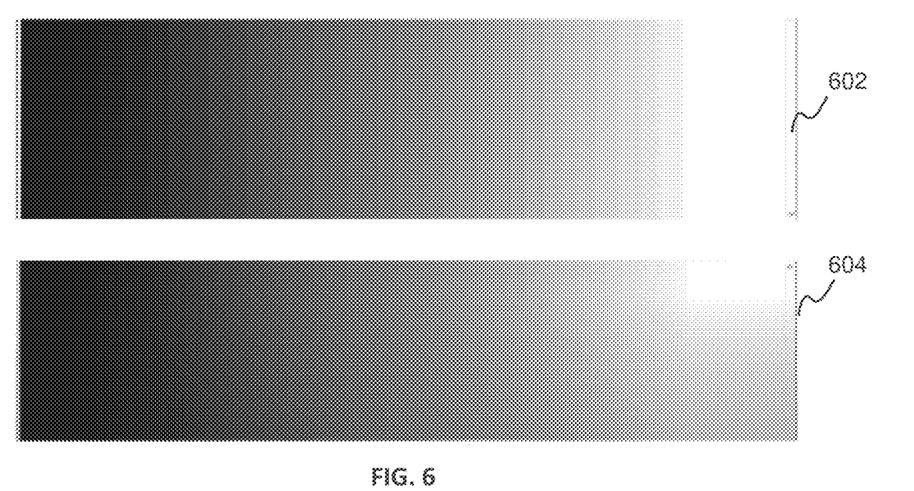
FIG. 6 shows an example of a gray scale image at 8 bits per pixel and a gray scale image at 16 bits per pixel in accordance with certain embodiments of the presently disclosed subject matter.

FIG. 6 illustrates an example of a gray scale image at 8 bits per pixel and a gray scale image at 16 bits per pixel in accordance with certain embodiments of the presently disclosed subject matter. The image 602 is acquired at 8 bits per pixel and has 256 different grey levels, whereas the image 604 is acquired at 16 bits per pixel and has 65,536 different grey levels. Both images represent the same color ramp with smooth color transitions by a gradient. As illustrated, image 602 possesses certain quantization noises and illustrates obvious gaps between the pixel values of adjacent pixels which indicates loss of fine image details, whereas image 604 can accurately track the original tone of the image signal and enable the extraction of delicate details that typically get lost in a lower bit depth.

Therefore, it is preferred to use specimen images acquired at a higher bit depth for sensitive defect detection as the images can carry more delicate details of the specimen which improves detection sensitivity. However, using images with a higher bit depth can significantly increase the required computing power and processing time for processing the images. For instance, a wafer image acquired at 16 bits per pixel will typically require a few times more processing power/time as compared to wafer images acquired at 8 bits per pixel, therefore demanding a much more advanced (thus costly) hardware infrastructure of the examination system in order to comply with the speed/throughput requirements. As a tradeoff, the wafer inspection images are typically grabbed at a relatively low bit depth due to throughput and tool configuration limitations, which is at the cost of less optimal detection sensitivity.

Accordingly, certain embodiments of the presently disclosed subject matter propose an examination system with a hybrid architecture capable of performing a distributed double-funnel defect detection with improved detection sensitivity while maintaining high throughput without significantly advancing hardware infrastructure, as will be detailed below.

The examination system 100 comprises a computer-based system 101 capable of defect detection on a semiconductor specimen in runtime based on runtime images obtained by the examination tool 120 during specimen fabrication. Specifically, the examination system 100 comprises a computer-based system 101. System 101 includes a first processor and memory circuitry (PMC) 102 operatively connected to a hardware-based I/O interface 126. The first PMC 102 is configured to provide processing necessary for operating the system as further detailed with reference to FIGS. 2, 3 and 5 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

Functional modules comprised in the first PMC 102 can include an image processing module 104 and a second defect detection module 106. In some embodiments, the second defect detection module 106 can comprises a machine learning model 108. The image processing module 104 can be configured to obtain, via the I/O interface 126 and from the examination tool 120 (e.g., an inspection tool), a first image representative of at least a part of the semiconductor specimen. The first image is acquired by the inspection tool at a first bit depth. The image processing module 104 can be further configured to convert the first image to a second image with a second bit depth. The second bit depth is a lower bit depth than the first bit depth.

The examination system 100 further comprises a second PMC 110 operatively connected to the first PMC 102. Similarly, the second PMC 110 is configured to provide processing necessary for operating the system as further detailed with reference to FIG. 4, and comprises a processor (not shown separately) and a memory (not shown separately). The processor of the second PMC 110 can be configured to execute one or more functional modules in accordance with computer-readable instructions implemented on a non-transitory computer-readable memory comprised in the second PMC. Such functional modules are referred to hereinafter as comprised in the second PMC. The second PMC 110 can comprise a first defect detection module 112.

Upon the second image being generated, the first PMC 102 can transmit the second image to the second PMC 110. The first defect detection module 112 in the second PMC 110 can be configured to perform first defect detection on the second image using a first defect detection algorithm, giving rise to a first set of defect candidates and locations thereof. The second PMC 110 then sends the locations of the first set of defect candidates back to the first PMC 102.

Upon receiving the locations from the second PMC, the first PMC 102 can be configured to extract, from the first image, a set of image patches corresponding to the locations, and perform second defect detection on the set of image patches using a second defect detection algorithm, giving rise to a second set of defect candidates.

By way of example, in some cases, the first PMC 102 can be implemented as a processing server or a main processing unit associated with the examination tool 120. The second PMC can be implemented as a wing/secondary processing unit operatively connected to the first PMC 102.

Operation of systems 100 and 101, the first PMC 102 and the second PMC 110, as well as the functional modules therein will be further detailed with reference to FIGS. 2-5.

In some cases, additionally to system 101, the examination system 100 can comprise one or more examination modules, such as, e.g., additional defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101 and/or the second PMC 110 can be provided to the one or more examination modules for further processing.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120. Accordingly, the images can be retrieved from the storage unit 122 and provided to the PMC 102 for further processing. The output of the system 101 and/or the second PMC, such as the first set and/or second set of defect candidates, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., the first bit depth, the second bit depth, one or more parameters of the first defect detection algorithm, and one or more parameters of the second defect detection algorithm, etc. The user may also view the operation results, such as, e.g., the detected defect candidates, on the GUI. In some cases, system 101 can be further configured to send, via I/O interface 126, the defect candidates to one or more of the examination tools 120 for further processing. In some cases, system 101 can be further configured to send the output data to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned components and functional modules shown in FIG. 1 can be distributed over several local and/or remote devices, and can be linked through a communication network. For instance, the first PMC 102 and the second PMC 110 can be located at the same entity (in some cases hosted by the same device) or distributed over different entities. In some cases, the second PMC 110 can be comprised as a part of system 101.

It is further noted that in other embodiments at least some of examination tools 120, storage unit 122 and/or GUI 124 can be external to the examination system 100 and operate in data communication with system 100 and 101 via I/O interface 126. System 101 and/or the second PMC 110 can be implemented as stand-alone computer(s) to be used in conjunction with the examination tools, and/or with the additional examination modules as described above. Alternatively, the respective functions of the system 101 and/or the second PMC 110 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of the systems 101 and 100, and vice versa.

Figure 2:
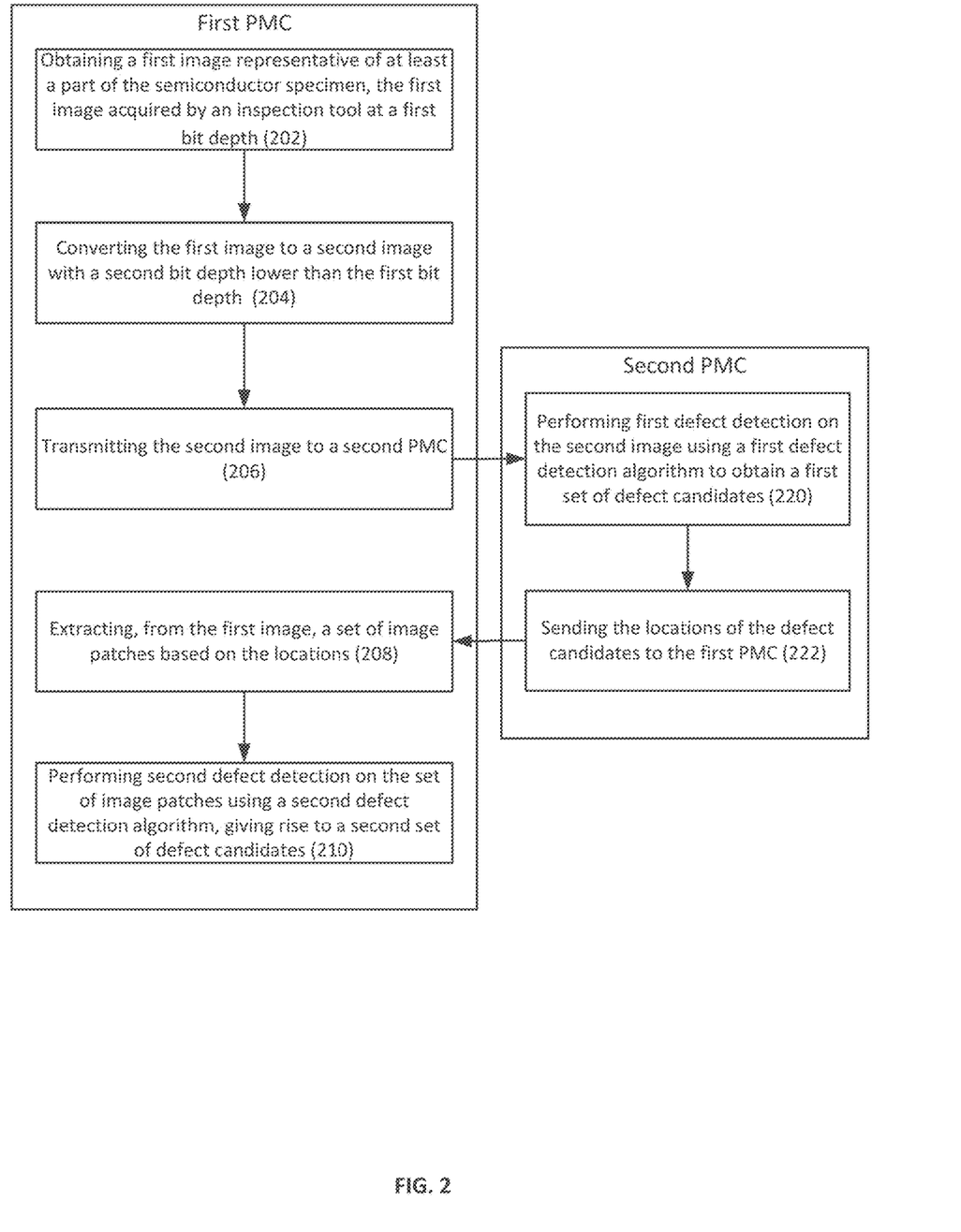
FIG. 2 illustrates a generalized flowchart of defect detection on a semiconductor specimen in accordance with certain embodiments of the presently disclosed subject matter.

Referring to FIG. 2, there is illustrated a generalized flowchart of defect detection on a semiconductor specimen in accordance with certain embodiments of the presently disclosed subject matter.

A first image representative of at least a part of the semiconductor specimen can be obtained (202) (e.g., by the image processing module 104 in the first PMC 102 via the I/O interface 126). The first image can be acquired by an inspection tool (e.g., one of the examination tools 120) at a first bit depth. As mentioned above, the first image can result from different examination modality(s), such as, e.g., by an optical inspection tool, an electron beam tool, etc., and the present disclosure is not limited by the specific examination modality used for acquiring the image.

As described above, bit depth refers to the number of bits used to represent a pixel in an image. The number of different colors/gray levels in an image depends on the depth of color or bits per pixel. In some embodiments, for purpose of enabling sensitive defect detection on the specimen, the first bit depth used to capture the first image can be a relatively high bit depth, such as, e.g., 16 bits per pixel, or in some cases, 24 or 32 bits per pixel, depending on the tool's imaging configurations.

As described above, the specimen (e.g., a wafer) can be continuously scanned by the inspection tool along the swaths on the wafer and the image data as instantly acquired, such as, e.g., an image slice/strip representative of a swath or part thereof, can be processed/analyzed on the fly, in parallel to the on-going image acquisition of further swaths. The first image used herein can refer to such an image slice/strip representative of at least part of the wafer that is scanned at one or more steps (e.g., a swath or part thereof). By way of example, the first image can be in the size of $\sim 10^{13}$ pixels with a relatively higher bit depth (e.g., 16 bits per pixel), thus preserving delicate details of the specimen. The first image can be recorded/stored, e.g., in the storage unit 122, upon acquisition and/or pre-processing thereof.

As the first image is typically a huge image, it conventionally demands significantly higher computing power and resources for processing. The present disclosure proposes a distributed double-funnel defect detection mechanism based on a hybrid system architecture, which is proved to have improved detection sensitivity while at the same time maintaining high throughput without significantly advancing the hardware infrastructure, as will be described now.

For performing the first funnel of defect detection, the first image is converted to a lower bit depth, thereby reducing the data volume to be adapted to the processing power of the second PMC. Specifically, the first image can be converted (204) (e.g., by the image processing module 104) to a second image with a second bit depth. The second bit depth is a lower bit depth than the first bit depth. By way of example, in cases where the first bit depth is 16 bits per pixel, the second bit depth can be 8 bits per pixel. In cases where the first bit depth is 24 or 32 bits per pixel, the second bit depth can be 16 bits per pixel. In some cases, the first bit depth and the second bit depth can be predetermined in accordance with one or more of the following: the hardware configurations of the inspection tool, the first PMC and/or the second PMC, and performance requirements of the defect detection, such as, e.g., throughput.

In some embodiments, a transformation function can be used for the bit depth conversion. The transformation function is usable for converting a range of pixel values in the first image that are represented by the first bit depth to a range of pixel values represented by the second bit depth. Various transformation functions can be used for the conversion between different bit depths. By way of example, the conversion can aim to map the pixel values in the original bit depth to the nearest values represented by the target bit depth. For instance, when converting from 16 bits per pixel to 8 bits per pixel, the range of pixel values of the 16 bits per pixel can be clustered into a number of clusters which can be represented by the range of pixel values of 8 bits per pixel. One possible way can be simply discarding the lower 8 bits which are of less significance. By way of another example, the conversion can use a transformation function that is specifically selected and configured to improve the accuracy/sensitivity of the second image with the second bit depth (with respect to the first image), as compared with using, e.g., standard linear transformation. The transformation function can be selected on the fly based on the pixel value distribution of the first image. For instance, the transformation function can be selected as one of the following, e.g., a logarithmic function, a bilinear function, a polynomial function, etc., whose parameter values are specifically configured in accordance with the pixel value distribution of the first image. In some cases, such a transformation function may be predetermined and applied to the first images on the fly, upon acquisition thereof. A second image, obtained using such a specifically configured transformation function, can have higher sensitivity and accuracy with respect to the first image (e.g., preserve more details and represent better the first image).

Figure 3:
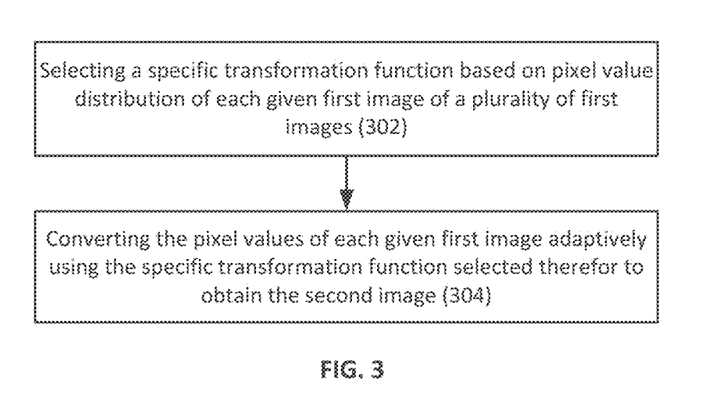
FIG. 3 illustrates a generalized flowchart of image conversion from the first bit depth to the second bit depth in accordance with certain embodiments of the presently disclosed subject matter.

FIG. 3 illustrates a generalized flowchart of image conversion from the first bit depth to the second bit depth in accordance with certain embodiments of the presently disclosed subject matter.

Since a plurality of first images are sequentially acquired by the inspection tool during the inspection of the semiconductor specimen and representative of different parts/portions thereof, these first images capture different patterns and have different pixel value distribution. By way of example, the pixel distribution can be represented in the form of a histogram of the pixel intensity values in an image. The histogram can be a graph illustrating the number of pixels in an image at each different intensity value found in that image. For instance, some first images may capture a bright area of the wafer, thus can be brighter in general (thus have more pixels with lower intensity values in the histogram), while some other images may capture a dark area, thus having a darker tone (thus have more pixels with higher intensity values in the histogram).

In such cases, a predetermined fixed transformation function may not be suitable for the bit depth conversion for all of the plurality of first images, as it cannot provide customized transformation for different images with different pixel value distribution. According to certain embodiments, a specific transformation function can be selected (302) for each given first image based on the pixel value distribution of the given first image. The pixel values of the given first image can be converted (304) adaptively using the specific transformation function selected therefor to obtain the second image. For instance, when a first image has a brighter tone in general, a transformation function, such as, e.g., a logarithmic function, can be configured to give more resolution/sensitivity to the lower pixel values (e.g., by adjusting the parameter values thereof), and used for the bit depth conversion thereof, thereby resulting in a second image (with a lower bit depth) having higher sensitivity and accuracy.

The second image can be transmitted (206) (e.g., by the first PMC 102) to a second PMC (e.g., the second PMC 110) operatively connected to the first PMC. The second PMC can be a wing processing unit used to perform the first funnel of defect detection on the specimen based on the second image. The second image of the specimen, although being converted to a lower bit depth, is still a massive image in the size of tens of terabytes. The first funnel aims to process such a huge image in an efficient manner with much less computing power, and provide an output of defect candidates to be further processed by the second funnel.

In some embodiments, the second PMC can be configured to perform (220) first defect detection on the second image using a first defect detection algorithm, giving rise to a first set of defect candidates and locations thereof. The first defect detection algorithm can be used to generate a defect map indicative of defect candidate distribution on the at least part of the specimen (i.e., suspected locations on the specimen having high probability of being a defect of interest (DOI)).

In some embodiments, the second PMC can be specifically configured/optimized to process images with the first bit depth. By way of example, the second PMC can comprise one or more digital signal processors (DSP) which can be optimized in various ways for image processing of a specific bit depth. In other examples, the second PMC can be implemented as one or more CPUs and/or GPUs and/or any mathematical accelerators. As the second bit depth is lower, the number of bits involved in the computation is lower, the computation is faster, and less computing power is required. In some embodiments, the instruction sets of the DSP can be designed to maximize/optimize the parallel processing capabilities of the DSP with respect to the second bit depth representation and the vector size in the DSP, etc.

The first defect detection algorithm can apply different detection methodologies for processing an inspection image (e.g., the second image) and generating the defect map. According to certain embodiments, the first defect detection algorithm can be a classic defect detection algorithm, such as a die-to-reference detection algorithm, such as, e.g., Die-to-Die (D2D), Die-to-History (D2H), Die-to-Database (D2DB), etc. In some other cases, the first defect detection algorithm can be based on a machine learning model. The present disclosure is not limited by specific detection technologies used therein. For illustrative purposes only, there are now described a few non-limiting examples of defect detection and defect map generation based on the inspection image.

Figure 4:
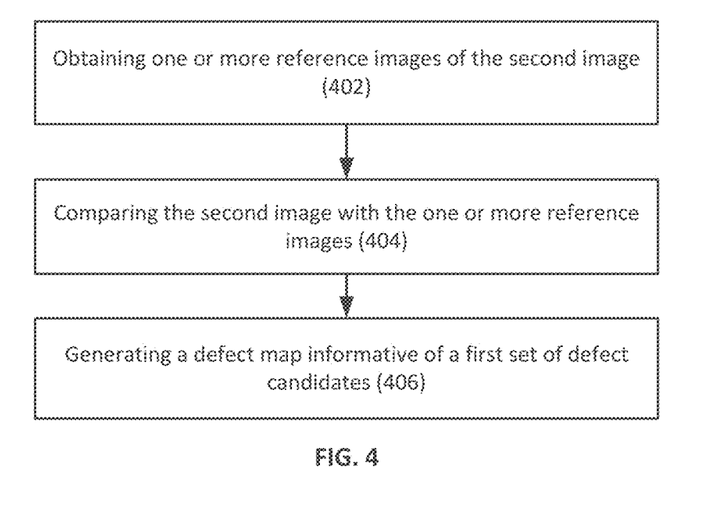
FIG. 4 illustrates a generalized flowchart of defect detection using the first defect detection algorithm in accordance with certain embodiments of the presently disclosed subject matter.

FIG. 4 illustrates a generalized flowchart of defect detection using the first defect detection algorithm in accordance with certain embodiments of the presently disclosed subject matter. In some embodiments, for each inspection image (e.g., the second image), one or more reference images can be used for defect detection. The one or more reference images can be obtained (402) in various ways, and the number of reference images used herein and the way of obtaining such images should not be construed to limit the present disclosure in any way. In some cases, the one or more reference images can be captured from one or more reference dies of the same specimen (e.g., one or more neighboring dies of an inspection die (where the first image corresponding to the second image is captured) on the specimen). In some other cases, the one or more reference images can include one or more images captured from one or more dies of another specimen (e.g., a second specimen that is different from the present specimen but shares the same design data). By way of example, in Die-to-History (D2H) inspection methodology, the inspection image can be captured from a present specimen at a present time (e.g., t=t'), and the one or more reference images can include one or more previous images captured from one or more dies on a second specimen at a baseline time (e.g., a previous time t=0). In some further embodiments, the one or more reference images can include at least one simulated image representing a given die of the one or more dies. By way of example, a simulated image can be generated based on design data (e.g., CAD data) of the die.

The second image can be compared (404) with the one or more reference images. At least one difference image can be generated based on the difference between pixel values of the inspection image, and pixel values derived from the one or more reference images. Optionally, at least one grade image can also be generated based on the at least one difference image. In some cases, the grade image can be constituted by pixels with values computed based on corresponding pixel values in the difference image and a predefined difference normalization factor. The predefined difference normalization factor can be determined based on behavior of a normal population of pixel values and can be used to normalize the pixel values of the difference image. By way of example, the grade of a pixel can be calculated as a ratio between a corresponding pixel value of the difference image and the predefined difference normalization factor. A defect map can be generated (406), e.g., by determining locations of suspected defects based on the at least one difference image or the at least one grade image using a detection threshold.

In some embodiments, the first defect detection algorithm can be specifically configured for defect detection based on images with the second bit depth. By way of example, when generating the defect map as described above, the detection threshold used for determining suspected defects can be configured in accordance with the detection sensitivity provided by the second bit depth. For instance, in cases where the second bit depth is 8 bits per pixel, the different gray levels that can be represented in the second image are 256. A detection threshold should be set/tuned in order to meet an inspection/review budget. The resolution of the threshold value can be based on the number of gray levels represented by the second bit depth. Since only 256 levels are possible, defects smaller than the quantization noise (the discrepancy between two adjacent levels) will not be detected.

In some embodiments, the generated defect map can be informative of a first set of defect candidates. Each defect candidate can be associated with one or more defect attributes, such as, e.g., location, strength, size, and shape of the defect candidate, etc. By way of example, the first set of defect candidates can comprise about $10^9$ defect candidates (as detected from the $10^{13}$ pixels in the second image). Upon detection, the second PMC is configured to send (222) at least the locations of the first set of candidates (with respect to the second image) to the first PMC for performing the second funnel of defect detection. In some cases, the second PMC can send the other defect attributes to the first PMC as well.

The first PMC, as aforementioned, can be implemented as a processing server associated with the inspection tool. As compared to the second PMC, in some cases the first PMC can be stronger in terms of computation efficiency of higher bit depth pixels, in particular with respect to parallel processing capabilities. It is proposed in the present disclosure to use the first PMC to perform the second funnel of defect detection based on the output of the first funnel of defect detection (i.e., the first set of defect candidates as detected by the second PMC).

Specifically, upon receiving the locations from the second PMC, a set of image patches can be extracted (208) (e.g., by the image processing module 104 in the first PMC 102) from the first image (which is recorded/stored by the first PMC) based on the locations, the set of image patches corresponding to the first set of defect candidates. The set of image patches are extracted from the first image with a higher bit depth, thus possess better preserved details for the first set of defect candidates, as compared to the second image.

Second defect detection can be performed (210) (e.g., by the second defect detection module 106 in the first PMC 102) on the set of image patches using a second defect detection algorithm, giving rise to a second set of defect candidates.

As aforementioned, the first PMC is typically equipped with stronger processing power as compared to the second PMC. By way of example, the first PMC can comprise one or more graphic processing units (GPUs). GPU is a specialized electronic circuit with a highly parallel structure designed to rapidly manipulate computer graphics and image processing. Compared to general-purpose central processing units (CPUs), instead of emphasizing context switching to manage multiple tasks, GPU acceleration emphasizes parallel data processing through a large number of cores, which makes GPU more efficient than CPUs for processing large blocks of data in parallel and managing high data throughput.

In particular, with the emergence of machine learning, especially deep learning, GPU's parallel processing architecture (e.g., single instruction, multiple data (SIMD) architecture) makes it well-suited to deep learning processes which require the same process to be performed for numerous data items. However, GPUs are costly resources (as compared to general purpose processors) that should be optimized to be used for effective and prioritized tasks.

On the other hand, machine learning technologies are used to assist the automated examination process of semiconductor specimens, so as to enable accurate and efficient solutions and promote higher yield. Training a ML model, especially a deep learning model, could be typically time-consuming using general purpose processors, considering the enormous training data to be processed and the number of hidden layers and nodes to be optimized. GPUs are advantageous in processing enormous training data and the ML model can be trained hundreds of times faster using GPUs rather than using CPUs.

Figure 5:
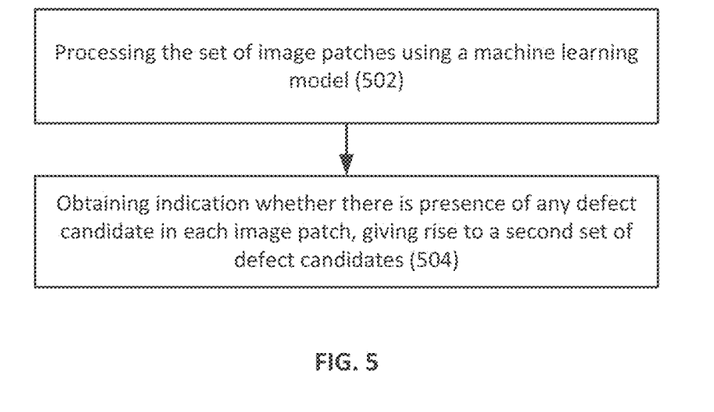
FIG. 5 illustrates a generalized flowchart of defect detection using the second defect detection algorithm in accordance with certain embodiments of the presently disclosed subject matter.

FIG. 5 illustrates a generalized flowchart of defect detection using the second defect detection algorithm in accordance with certain embodiments of the presently disclosed subject matter. According to certain embodiments, the second defect detection module as comprised in the first PMC can comprise a machine learning (ML) model (e.g., the ML model 108). The set of image patches, as extracted from the first image and corresponding to the first set of defect candidates, can be processed (502) by the ML model, thereby obtaining (504), as an output of the ML model, an indication of whether there is presence of any defect candidate in each image patch, giving rise to a second set of defect candidates. The ML model is previously trained based on training images with the first bit depth.

According to certain embodiments, the ML model referred to herein can be implemented as various types of machine learning models, such as, e.g., a decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a Deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes. An exemplified DNN structure is illustrated below.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

As aforementioned, in some embodiments, the first PMC can comprise one or more graphic processing units (GPUs) specifically optimized for processing images with the first bit depth (i.e., a relatively higher bit depth) using a ML model (e.g., DNN) as described above. By way of example, certain GPU's internal electronic structure is optimized for floating point 32 representation. Single-precision floating-point format (sometimes referred to as FP32 or float32) is a computer number format, usually occupying 32 bits in computer memory. It represents a wide dynamic range of numeric values by using a floating radix point. The floating-point representation of GPU can improve detection sensitivity, as a floating-point variable can represent a wider range of numbers as required by the 16 bit depth.

In some cases, the first PMC can also include a general processor, such as a CPU, for handling general purpose processing, or, alternatively, use other types of accelerators instead of a GPU.

In some cases, the second set of defect candidates detected by the second funnel of defect detection can be in the order of $10^6$ candidates, as detected from the set of image patches corresponding to the first set of defect candidates which are in the order of $10^9$ candidates. Optionally, the first PMC can be further configured to filter the second set of defect candidates using one or more additional filtering algorithms. Optionally, the second set of defect candidates can be reviewed by a review tool (e.g., one of the examination tools 120) to ascertain whether each defect candidate in the second set is a DOI or nuisance, giving rise to a set of DOIs revealed by the review process.

According to certain embodiments, optionally, the first PMC can comprise a training module configured to train the machine learning model 108 for defect detection using a training set. A training set used for training a ML model in supervised learning normally includes one or more training samples, each including a respective training image and corresponding ground truth data associated therewith. Ground truth data can include label data of the training image which is indicative of whether there is presence of a DOI or nuisance in the training image.

A training image can be a "real world" image of a semiconductor specimen obtained by an inspection tool in a fabrication process thereof. Ground truth data can be obtained in various ways, such as, e.g., by manual annotation, synthetic generation based on design data, machine learning based, or a combination of the above. For instance, the label data can be provided, e.g., in the form of bounding boxes of the DOIs or in the form of a binary image in which only pixels belonging to DOIs get a value of "1" and non-defective pixels get a value of "0" etc. A cost function used during training of the ML can be based on detection accuracy/capture rate, and, optionally, also based on a penalty for misdetection and over-detections.

According to certain embodiments, the ML model can be pre-trained during a setup phase and the trained ML model can be deployed in production for defect detection of production wafers in runtime. In some further embodiments, the deployed ML model can be continuously re-trained and updated during runtime inspection. By way of example, for a given production wafer, the training set used to train the ML model can include the image patches (from the set of image patches as extracted from the first image) corresponding to the set of DOIs as revealed by the review process, which are associated with the label of DOI, and image patches corresponding to the remaining non-DOI defect candidates in the second set which are associated with the label of nuisance. Optionally, the defect attributes characterizing the defect candidates (as optionally sent by the second PMC) can be included in the training set as well.

The training set can be used to re-train the ML model, giving rise to an updated ML model, which can replace the previous deployed ML model. The updated ML model can be used to process the set of image patches corresponding to the first set of defect candidates again, giving rise to a new second set of defect candidates. The new second set of defect candidates can be further reviewed by the review tool, thereby obtaining a new set of DOIs. A new training set can be generated comprising the image patches corresponding to the new set of DOIs and the remaining image patches corresponding to the remaining non-DOI defect candidates in the new second set. The re-training process and detection process can be repeated using updated new training sets and ML models until a criterion is met, thereby enabling to reveal more DOIs from the given wafer and improving capture rate and detection sensitivity thereof.

According to certain embodiments, the training process as described above can be included as part of a process for generating an inspection/detection recipe usable by system 101 (e.g., as comprised in the second defect detection module 106) for defect detection in runtime (where the ML model, once trained, can serve as part of the inspection recipe). Therefore, the presently disclosed subject matter also includes a system and method for generating an inspection recipe as described above.

It is to be noted that examples illustrated in the present disclosure, such as, e.g., the examples of first bit depth and second bit depth, the structures of the first PMC and second PMC, the exemplified first and second defect detection algorithms, etc., are illustrated for exemplary purposes, and should not be regarded as limiting the present disclosure in any way. Other appropriate examples/implementations can be used in addition to, or in lieu of the above.

Among advantages of certain embodiments of the defect detection system as described herein is that it provides a hybrid system architecture capable of efficiently processing massive inspection image data of a specimen acquired at a relatively high bit depth to detect defects with improved detection sensitivity, while at the same time maintaining high throughput, without significantly increasing the required computing power and resources.

The hybrid architecture comprises a first PMC (e.g., a processing server) and a second PMC (e.g., a wing processing unit) operatively connected to each other, where the first PMC has advanced processing power (in particular stronger parallel processing capabilities) with respect to the second PMC. The second PMC is configured to perform a first funnel of defection detection based on converted images with a lower bit depth, and the first PMC is configured to perform a second funnel of defect detection to further filter the output of the first funnel. The first and second PMCs are specifically leveraged/balanced to take advantage of their respective computing powers in an efficient way and perform different defect detection algorithms on images with different bit depths, so as to optimize defect detection performance within the system capacity.

Figure 7:
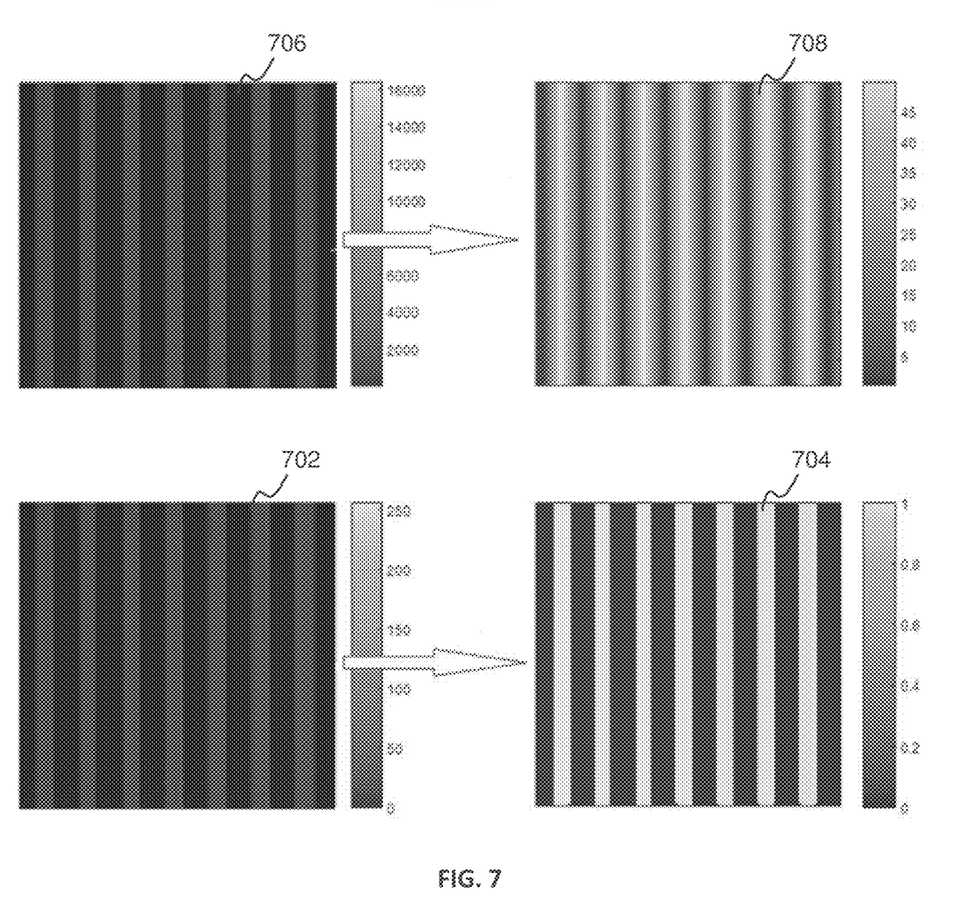
FIG. 7 illustrates two images acquired for a relatively dark area of a wafer with different bit depths in accordance with certain embodiments of the presently disclosed subject matter.

In particular, the first image of the wafer is acquired at a relatively high bit depth, and is therefore capable of preserving delicate detail information of the wafer as compared to an image acquired at a relatively low bit depth. As illustrated in FIG. 7, for a relatively dark area of a wafer which includes line structures, an image 702 acquired with a relatively lower bit depth (e.g., 8 bits per pixel) and an image 706 acquired with a relatively higher bit depth (e.g., 14 bits per pixel) are shown. After applying certain preliminary image processing on the images, such as brightening processing, it can be seen that certain delicate details, such as details with respect to the edges of the line structures were lost in the brightened image 704 corresponding to the image 702, whereas the brightened image 708 corresponding to image 706 has well preserved edge details, which, when being used for defect detection or other examinations, can provide more accurate/sensitive results.

The first image is converted to a lower bit depth so as to be adapted to the processing power of the second PMC and enable efficient processing of the first funnel of defect detection by the second PMC. The second funnel of defect detection is performed on image patches with the higher bit depth (as extracted from the first image) thus can take advantage of the preserved image details in the images for a relatively advanced defect detection (e.g., based on machine learning) as powered by the first PMC. The two funnels together result in a defect detection with improved detection sensitivity and efficiency, while maintaining high throughput and not significantly increasing the required computing power and resources.

As described above, the defect detection system needs to rapidly analyze very large images (e.g., in the size of hundreds of terabytes) in a short time while saving on processing costs. The processing task is split between the two PMCs. Specifically, the first PMC is optimized for higher bit depth (e.g., the first bit depth) processing and is thereby capable of resulting in higher detection sensitivity. The second PMC is optimized for lower bit depth processing and is thereby capable of resulting in faster analysis (better computation efficiency) and lower computation costs. By splitting the image processing between the two PMCs in such a way, it enables high throughput without sacrificing high detection sensitivity.

Among further advantages of certain embodiments of the training process of the ML model as described herein is that the ML model used for defect detection by the first PMC can be repetitively and continuously retrained and updated in production, based on the up-to-date production wafer data, thereby enabling to optimize the ML model to be more robust to wafer/process variation, and be capable of revealing more DOIs for a given wafer using updated ML models in an iterative manner, thus improving capture rate and detection sensitivity for the wafer.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of defect detection of a semiconductor specimen, the system comprising a first processing and memory circuitry (PMC) configured to:
    obtain a first image representative of at least a part of the semiconductor specimen, the first image acquired by an inspection tool at a first bit depth;
    convert the first image to a second image with a second bit depth, wherein the second bit depth is a lower bit depth than the first bit depth;
    transmit the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC;
    upon receiving the locations from the second PMC, extract, from the first image, a set of image patches corresponding to the first set of defect candidates based on the locations; and
    perform second defect detection on the set of image patches using a second defect detection algorithm, giving rise to a second set of defect candidates.

2. The computerized system according to claim 1, wherein the first bit depth is one of: 32 bits per pixel, 24 bits per pixel, and 16 bits per pixel; and the second bit depth is one of: 16 bits per pixel and 8 bits per pixel.

3. The computerized system according to claim 1, wherein the first PMC comprises one or more graphics processing units (GPUs) optimized to process images with the first bit depth.

4. The computerized system according to claim 1, wherein the second PMC comprises one or more digital signal processors (DSPs) optimized to process images with the second bit depth.

5. The computerized system according to claim 1, wherein the first PMC is configured to convert the first image by selecting a transformation function based on pixel value distribution of the first image, the transformation function usable for converting a range of pixel values represented by the first bit depth to a range of pixel values represented by the second bit depth, and the pixel values of the first image are converted using the transformation function to obtain the second image.

6. The computerized system according to claim 5, wherein the transformation function is specifically selected and configured to improve accuracy of the second image with the second bit depth.

7. The computerized system according to claim 1, wherein the first defect detection algorithm is a die-to-reference detection algorithm using one or more reference images of the second image.

8. The computerized system according to claim 7, wherein the first defect detection algorithm is specifically configured for defect detection on one or more second images with the second bit depth.

9. The computerized system according to claim 1, wherein the second defect detection algorithm comprises a machine learning (ML) model trained using one or more training images with the first bit depth and respective labels associated therewith indicative of presence of defects of interest (DOIs) or nuisances thereof.

10. The computerized system according to claim 9, wherein the second set of defect candidates are reviewed by a review tool, giving rise to a set of DOIs, the ML model is re-trained using image patches corresponding to the set of DOIs and associated with a label of DOI, and image patches corresponding to non-DOI defect candidates from the second set of defect candidates and associated with a label of nuisance, and the re-trained ML model is used to re-perform the second defect detection.

11. The computerized system according to claim 1, wherein the first PMC is configured to obtain a plurality of first images sequentially acquired by the inspection tool during runtime inspection and representative of different parts of the semiconductor specimen, and perform the converting, transmitting, extracting and performing for each given first image of the plurality of first images, and wherein each given first image is converted adaptively by selecting a specific transformation function based on pixel value distribution of the given first image.

12. The computerized system according to claim 1, further comprising the second PMC, wherein the first PMC is optimized for first bit depth processing and is thereby capable of improving detection sensitivity, the second PMC is optimized for second bit depth processing and is thereby capable of improving computation efficiency and lowering computation cost, and wherein the first PMC and the second PMC are leveraged in a specific way for performing respective defect detections on images with different bit depths, thereby enabling improved throughput without sacrificing detection sensitivity.

13. A computerized method of defect detection of a semiconductor specimen, the method performed by a first processing and memory circuitry (PMC) and comprising:
obtaining a first image representative of at least a part of the semiconductor specimen, the first image acquired by an inspection tool at a first bit depth;
converting the first image to a second image with a second bit depth, wherein the second bit depth is a lower bit depth than the first bit depth;
transmitting the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC;
upon receiving the locations from the second PMC, extracting, from the first image, a set of image patches corresponding to the first set of defect candidates based on the locations; and
performing second defect detection on the set of image patches using a second defect detection algorithm, giving rise to a second set of defect candidates.

14. The computerized method according to claim 13, wherein the first PMC comprises one or more graphic processing units (GPUs) optimized to process images with the first bit depth.

15. The computerized method according to claim 13, wherein the second PMC comprises one or more digital signal processors (DSPs) optimized to process images with the second bit depth.

16. The computerized method according to claim 13, wherein the converting the first image comprises selecting a transformation function based on pixel value distribution of the first image, the transformation function usable for converting a range of pixel values represented by the first bit depth to a range of pixel values represented by the second bit depth, and the pixel values of the first image are converted using the transformation function to obtain the second image.

17. The computerized method according to claim 13, wherein the second defect detection algorithm comprises a machine learning (ML) model trained using one or more training images with the first bit depth and respective labels associated therewith indicative of presence of defects of interest (DOIs) or nuisances thereof.

18. The computerized method according to claim 17, wherein the second set of defect candidates are reviewed by a review tool, giving rise to a set of DOIs, the ML model is re-trained using image patches corresponding to the set of DOIs and associated with a label of DOI, and image patches corresponding to non-DOI defect candidates from the second set of defect candidates and associated with a label of nuisance, and the re-trained ML model is used to re-perform the second defect detection.

19. The computerized method according to claim 13, wherein the first PMC is optimized for first bit depth processing and is thereby capable of improving detection sensitivity, the second PMC is optimized for second bit depth processing and is thereby capable of improving computation efficiency and lowering computation cost, and wherein the first PMC and the second PMC are leveraged in a specific way for performing respective defect detections on images with different bit depths, thereby enabling improved throughput without sacrificing detection sensitivity.

20. A non-transitory computer readable storage medium tangibly embodying a program of instructions that, when executed by a computer, cause the computer to perform a method of defect detection of a semiconductor specimen, the method comprising:
- obtaining a first image representative of at least a part of the semiconductor specimen, the first image acquired by an inspection tool at a first bit depth;
- converting the first image to a second image with a second bit depth, wherein the second bit depth is a lower bit depth than the first bit depth;
- transmitting the second image to a second PMC operatively connected to the first PMC, wherein the second PMC is configured to perform first defect detection on the second image using a first defect detection algorithm, giving rise to a first set of defect candidates, and send locations of the first set of defect candidates to the first PMC;
- upon receiving the locations from the second PMC, extracting, from the first image, a set of image patches corresponding to the first set of defect candidates based on the locations; and
- performing second defect detection on the set of image patches using a second defect detection algorithm, giving rise to a second set of defect candidates.

* * * * *